United States Patent [19]

Hall

[11] Patent Number: 5,394,520
[45] Date of Patent: Feb. 28, 1995

[54] IMAGING APPARATUS FOR PROVIDING A COMPOSITE DIGITAL REPRESENTATION OF A SCENE WITHIN A FIELD OF REGARD

[75] Inventor: John T. Hall, Northridge, Calif.

[73] Assignee: Hughes Aircraft Company, Los Angeles, Calif.

[21] Appl. No.: 765,788

[22] Filed: Sep. 26, 1991

[51] Int. Cl.⁶ .................................... G06F 15/62
[52] U.S. Cl. ............................. 395/135; 395/133; 395/164; 382/48
[58] Field of Search ......................... 395/133–136, 395/139, 155–158, 164–166; 382/48; 358/88

[56] References Cited

U.S. PATENT DOCUMENTS

| | | | |
|---|---|---|---|
| 4,914,734 | 4/1990 | Love et al. | 342/64 |
| 5,109,348 | 4/1992 | Pfeiffer et al. | 395/164 |
| 5,142,357 | 8/1992 | Lipton et al. | 358/88 |
| 5,173,949 | 12/1992 | Peregrim et al. | 382/48 |

FOREIGN PATENT DOCUMENTS 3013078  3/1991  Japan .................... H04N 5/321

OTHER PUBLICATIONS

NTIS Tech Notes Sep. 1990, Springfield, Va. US p. 683, XP162520 NASA's Jet Propulsion Laboratory "Computer Assembles Mosaics of Satellite-SAR Imagery".

*Primary Examiner*—Almis Jankus
*Attorney, Agent, or Firm*—Charles D. Brown; Randall M. Heald; Wanda K. Denson-Low

[57] ABSTRACT

A wide field imaging system having high precision and resolution is disclosed herein. The wide field of regard imaging system 10 of the present invention is operative to provide a composite digital representation of a scene within a field of regard. The system 10 of the present invention includes a sensor arrangement 12 for generating first and second digital representations of first and second framed regions within the field of regard. A scene correlator 18 processes the first and second digital representations to generate offset parameters indicative of the relative locations of the first and second framed regions within the field of regard. The offset parameters are used to combine the first and second digital representations within a frame store memory 20 to synthesize the composite digital representation of the scene.

15 Claims, 3 Drawing Sheets

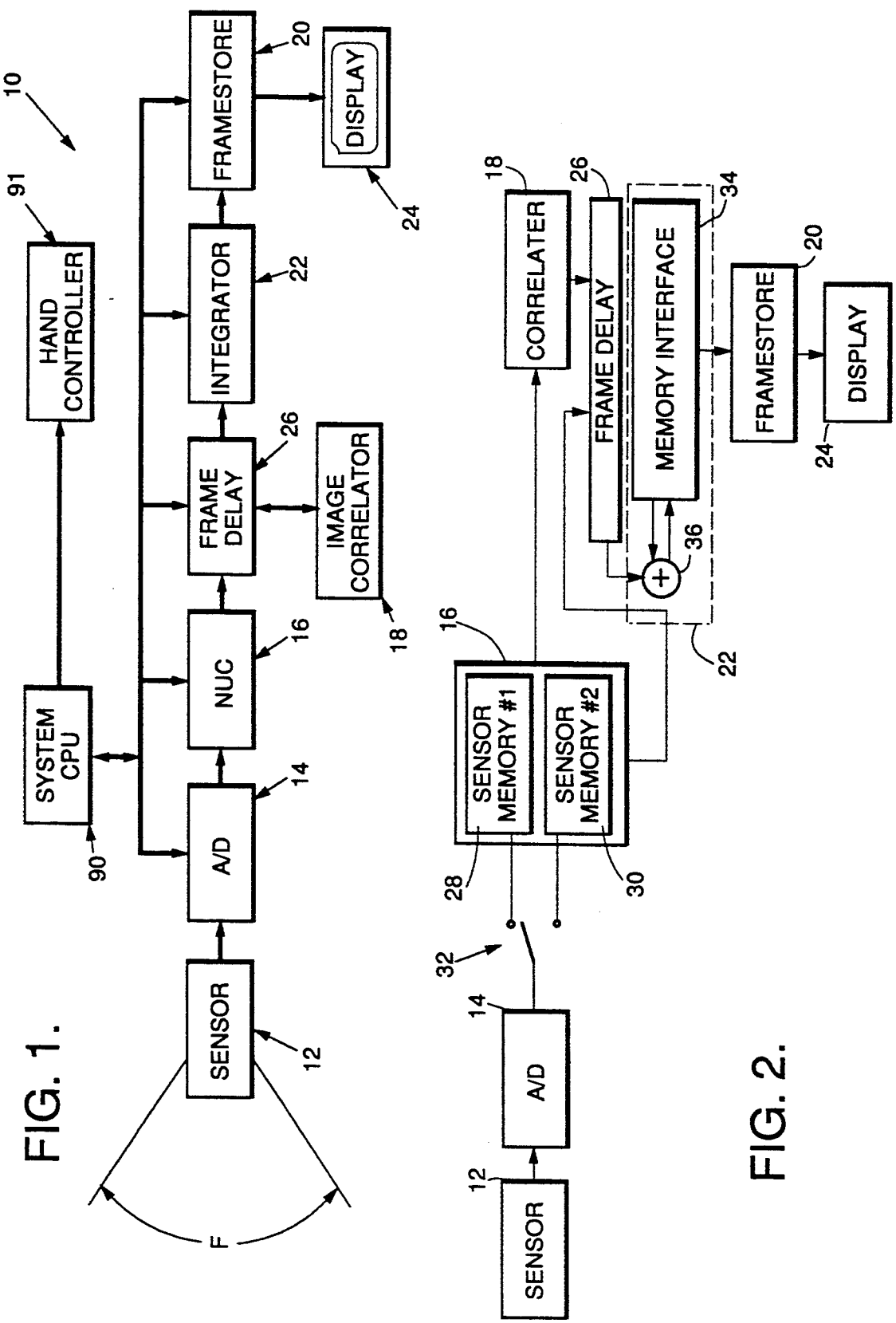

IMAGING APPARATUS FOR PROVIDING A COMPOSITE DIGITAL REPRESENTATION OF A SCENE WITHIN A FIELD OF REGARD

BACKGROUND OF THE INVENTION

1. Field of the Invention

This invention relates to systems for creating images of a scene. More specifically, this invention relates to systems operative to generate a scene image spanning a wide field of regard.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Infrared imaging systems are used in a variety of military and commercial applications to provide either an operator or a guidance system with an infrared view of a scene. IR imaging systems are typically characterized as having a "field of regard" which refers to the angular breadth of the resultant scene image. One benefit accruing from a wide field of regard is that a viewer of the wide-field image may observe individual objects therein within the context of a larger scene. However, in conventional imaging systems increases in the field of regard generally come at the expense of decreases in image resolution. Image resolution may also be impaired by variable atmospheric conditions.

Various methods have been utilized to avoid the necessity of striking a balance between image resolution and field of regard. For example, in certain imaging systems a mirror is operative to pan across the field of regard by rotating about an axis. Rotation of the mirror allows a linear array of detectors in optical alignment therewith to collect radiant energy from across the field of regard. The radiant energy from the scene within the field of regard is focused upon the detector array by one of a pair of lenses. One of the lenses encompasses a wide field of view, while the other covers a relatively narrow field of view. The lenses are then mechanically moved in and out of the optical train of the imaging system to alternately provide a wide field of regard or improved resolution.

One disadvantage of this approach is that the rate at which an operator may switch between the fields of view of the two lenses is limited by the response of the servo system used to alternately interpose the lenses within the optical train. In addition, it is often difficult to capture a moving object within the field of view of the high resolution lens even though the location of the object may be readily apparent within the wider field of view.

In a second approach, an imaging sensor (such as the linear array described above) is mounted on a gimbal scan mechanism. The gimbal is rotated to direct the field of view of the sensor to various regions within the field of regard, with frames of image data being produced by the sensor at a known rate (e.g. 60 Hz). Although individual regions throughout the entire field of regard may be viewed in isolation using this method, a composite image of the entire field of regard is not produced. It is also generally difficult to maintain a moving object within the sensor field of view (by rotation of the gimbal) without "smearing" the resultant image. Moreover, complex processing methods are required to create images across consecutive frames of image data.

A further complication associated with a gimbal scanned sensor system is due to the fact that successive image frames must be aligned in real time in order to display a portion of the field of regard which subtends an angle exceeding that of a single image frame. This alignment is typically effected by use of a plurality of pickoff detectors to ascertain the instantaneous angular orientation of the gimbal within the field of view. The position information garnered from the pickoff detectors is used by the display driver to appropriately register successive frames on a viewing display. Unfortunately, pickoff inaccuracies and gimbal platform dynamics limit alignment of adjacent pixels. Moreover, the image registration process is impaired as a result of spurious acceleration of the gimbal. That is, changes in the angular velocity of the gimbal between pickoff points can lead to misalignment of frame images in the viewing display.

In a third approach, image data from a number of separate sensors is used to generate a real-time image of an entire field of regard. The fields of view of the individual sensors are often arranged to slightly overlap in order to prevent seams from appearing in the composite image. However, complex and expensive image processing hardware is typically required to implement this multi-sensor scheme. In addition, multi-sensor systems offer only minimal improvement in signal-to-noise ratio relative to single sensor systems.

In each of the aforementioned conventional imaging schemes the number of individual detectors included within sensors employed therein has dramatically increased in recent years. In particular, advances in semiconductor fabrication techniques have significantly increased the average yield (number of properly functioning detectors per semiconductor chip) of batch-processed detector arrays. Nonetheless, since current yields average less than 100%, a number of defective detectors are typically present within each array. An interpolation scheme wherein the data from adjacent detectors is averaged has been employed to partially compensate for these defective detectors. However, since "real" pixels are still missing from the region canvassed by the defective detector, the resultant image remains degraded even after such compensation. As a consequence, targets associated with such pixels may be overlooked or misinterpreted.

It follows that a need in the art exists for a single sensor, high resolution imaging system having a wide field of regard.

SUMMARY OF THE INVENTION

The need in the art for a wide field imaging system having high sensitivity and resolution is addressed by the wide field of regard imaging system of the present invention. The inventive imaging system is operative to provide a composite digital representation of a scene within a field of regard. The system of the present invention includes a sensor arrangement for generating first and second digital representations of first and second framed regions within the field of regard. A scene correlator processes the first and second digital representations to generate offset parameters indicative of the relative locations of the first and second framed regions within the field of regard. The offset parameters are used to combine the first and second digital representations within a frame store memory to synthesize the composite digital representation of the scene.

BRIEF DESCRIPTION OF THE DRAWINGS

FIG. 1 is a simplified block diagram of the wide field of regard imaging system of the present invention.

FIG. 2 shows a more detailed block diagram of the wide field of regard imaging system of the present invention.

DETAILED DESCRIPTION OF THE INVENTION

Figures 3A, 3B, 3C:
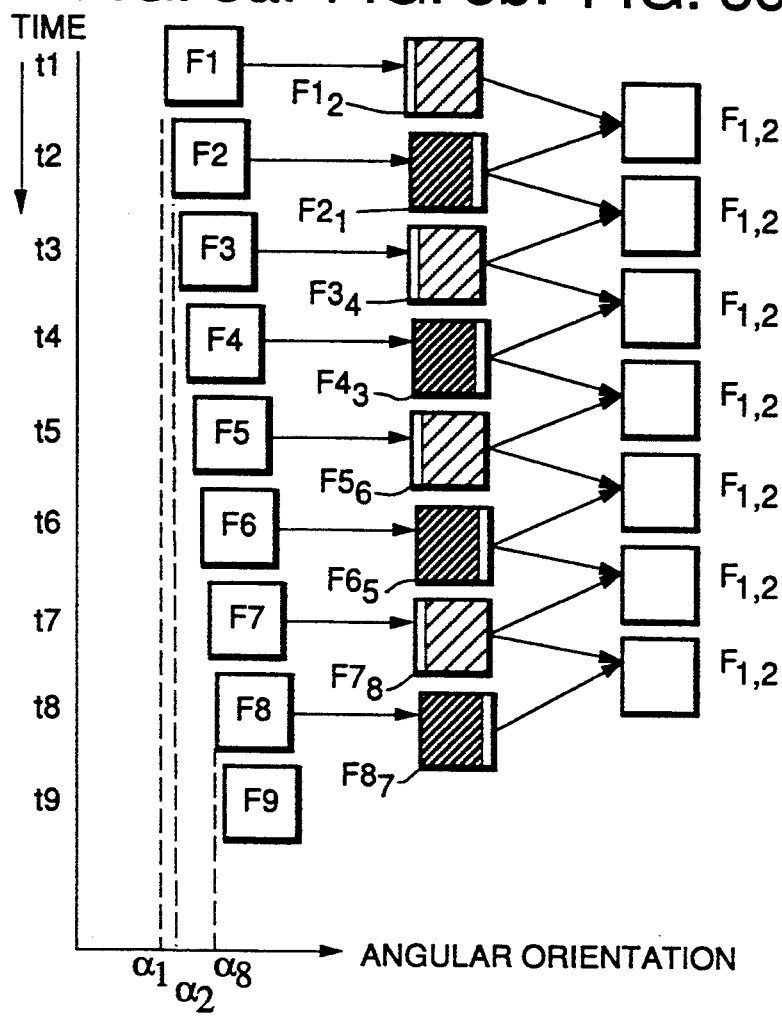
FIGS. 3(a), 3(b) and 3(c) illustrate the manner in which a scene correlator included within the inventive imaging system is operative to generate offset parameters indicative of the relative displacement between adjacent image frames.

FIG. 1 is a simplified block diagram of the wide field of regard imaging system 10 of the present invention. The inventive system 10 is operative to produce an image of a scene within a wide field of regard F. As described more fully below, successive frames of overlapping image data from a gimbal scanned sensor 12 are sampled by an analog-to-digital (A/D) converter 14 and transferred to a nonuniformity correction (NUC) module 16. A scene correlator 18 provides a set of offset parameters to a frame delay module 26 indicative of the spatial relationship between successive image frames present in the NUC module 16. The frame delay module 26 may be adjusted to suitably delay successive image frames in accordance with the timing of the correlator 18. The offset parameters are then used to appropriately register the sampled data of the image frames within a pixel integrator module 22. The integrator module 22 feeds the values of sampled data (pixels) from overlapping image frames assigned by the correlator 18 to common locations within a frame store memory 20. Since the noise associated with each sampled data value assigned to a particular common memory location is uncorrelated, the integrator 22 serves to increase the signal-to-noise ratio of each entry within the frame store memory 20. In this manner, the integrator 22 operates to enhance the signal-to-noise ratio of the composite wide field scene image. A second function of the integration module is to detect "dead" entries in each frame and to integrate only entries within each frame which correspond to actual scene imagery. Finally, the integrator 22 operates to count the pixel values included within the memory 20 associated with actual scene imagery. When the wide field image is read out from memory 20 to a display 24 the value of each pixel value is adjusted by this count in conformity with the dynamic range of the display 24.

As shown in FIG. 1, a system central processing unit (CPU) 90 is in communication with the A/D converter 14, compensation module 16, frame delay module 26, integrator 22, and frame store memory 20. The CPU 90 thereby ensures proper timing of the transfer of image data between the elements of the inventive system 10. In addition, as is described hereinafter, the CPU 90 is responsive to an external hand controller 91 designed to isolate a particular reference frame within the wide field of regard.

FIG. 2 is a more detailed block diagram of the wide field of regard imaging system 10 of the present invention wherein the system CPU 90 and controller 91 have been omitted for purposes of clarity. The sensor 12 provides analog image information to the A/D converter 14 as the sensor 12 is horizontally panned through the wide field of regard F (FIG. 1). Although the sensor 12 will preferably be realized by a two-dimensional focal plane array mounted on a gimbal scan mechanism, other sensor arrangements (e.g. visible television) capable of collecting video data from across the field of regard F may be substituted therefor. The sensor 12 is chosen to have a field of view substantially narrower than the field of regard F—thereby allowing the sensor 12 to be of relatively high resolution. The analog image data produced by the sensor 12 corresponds to distinct image frames within the field of regard. That is, the sensor 12 takes "snapshots" of the portion of the scene (not shown) within the field of view thereof at a known rate (e.g. 60 Hz). The rate of angular rotation of the sensor 12 through the field of regard F is chosen such that a substantial portion of adjacent image frames spatially overlap.

The module 16 includes first and second sensor memory arrays 28 and 30 connected to the A/D converter 14 via an electronic switch 32. In the preferred embodiment the correction module 16 includes analog gain control and offset adjustment circuitry. The gain of the module 16 is adjusted in response to the strength of signals from the focal plane. Pixel values (digitized image data) from consecutive image frames are alternately read into the arrays 28 and 30 by changing the state of the switch 32. Specifically, if pixel values from a first image frame are read into the first array 28, then pixel values from a second image frame are read into the second array 30. By electronically toggling the switch 32 (e.g. through a blanking signal), pixel values from a third image frame would then replace the pixel values from the first frame stored in the first array 28.

The scene correlator 18 implements a correlation algorithm to generate offset parameters indicative of the spatial relationship between the image frames associated with the pixel values stored in the first and second arrays 28 and 30. It is noted that consecutive image frames may be spatially displaced both horizontally and vertically within the field of regard if, for example, the system 10 of the present invention is mounted on a moving vehicle. The correlator 18 employs an iterative convolution procedure to determine the offset parameters between the first and second memory arrays 28 and 30. The result of this convolution procedure may generally be represented as a peaked surface, with the coordinates (x,y) of the largest peak being associated with the offset parameters. Using the results of this convolution the correlator 18 is operative to ascertain the number of rows and columns the second array 30 that should be offset from the first such that when the displaced arrays are overlaid in the frame store memory 20 the number of frame store memory locations having a common pixel value is maximized. In this manner the offset parameters produced by the correlator mirror the spatial displacement between the image frames stored in the arrays 28 and 30.

More specifically, the correlator 18 performs an image-to-image registration. To determine the x and y, offsets the correlator includes a fixed grid of correlator cells which uniformly cover the overlapping area between successive image frames. The correlator 18 first reads and filters the last (i.e. "live") frame of image data transferred thereto to ascertain an appropriate search area over which to convolve the live image with a stored reference image. The reference image generally consists of a grid of sixty correlator cells. The placement of the grid within a 128 × 128 frame store module is either at the leftmost, center, or the rightmost portion thereof, depending on whether the gimbal is scanning left, not scanning, or scanning right, respectively. Out of the sixty correlator cells, the first thirty two cells with sufficient image detail are selected for convolution. When the reference locations have been computed, the correlator stores the reference image in the appropriate reference cells, while providing the number of active pixels in each reference cell. An active pixel is one having a magnitude in excess of that defined by a mask threshold. The number of active pixels is used in computing the aforementioned validation threshold.

In particular, the amplitude validation threshold is used as a figure of merit for the correlation process. A minimum threshold is used to ensure sufficient content for accurate correlation. The amplitude validation threshold will typically be set at eighty percent of the total number of active pixels.

From the reference image, a set of reference pixels (cells) is selected which the correlator will attempt to locate within the filtered live image. The location of each of these cells and the measured gimbal displacement between image samplings determine the approximate location of each cell in the live image. The correlator will search the convolution window centered on each cell's expected location to find the exact location of the reference cell in the live image. Typically, the search range for the convolution window will be ±7 pixels in the x direction and ±3 pixels in the y direction. The live image then becomes the reference image from which a new set of reference cells is selected for the convolution in the next field.

Insufficient scene registration is determined by comparing the hardware convolution result to an amplitude validation threshold. If the correlation peak magnitude is greater than the amplitude validation threshold, the results are assumed invalid. A secondary correlator may be employed such that the reference cells in the primary correlator are refreshed only when insufficient scene registration is encountered. Retaining usable reference cells within the primary correlator for as long as possible may provide improved scene matching by eliminating random walk effects. In the event that both the primary and secondary correlation results fail to achieve the validation threshold, the gimbal inputs alone may be utilized to position the live image.

The correlator 18 will preferably include an eight by eight set of reference cells for performing the correlation upon each image frame. For each frame, a convolution surface is formed by sliding the cell over the corresponding convolution window and, for each possible location, counting the number of pixel matches between the cell and the live image. The individual correlation surfaces are summed together to create a single composite surface, the location of the surface peak indicating the position of best match between the reference and live images. The magnitude of the peak indicates the degree to which the live image conforms to the stored reference image.

FIGS. 3(a), 3(b) and 3(c) illustrate the manner in which the correlator 18 is operative to generate offset parameters indicative of the relative displacement between adjacent image frames. As shown in FIG. 3(a), a first frame F1 of pixel data collected by the sensor 12 while at an angular orientation of $\alpha_1$ within the field of regard F is stored in the first memory array 28 at time $t_1$. Similarly, a second frame F2 collected at an angular orientation of $\alpha_2$ at time $t_2$ is stored in the second memory array 30. As shown in FIG. 3(b), the first frame F1 includes a subframe $F1_2$ of pixels in common with a subframe $F2_1$ of pixels within the second frame F2. By identifying the subframes $F1_2$ and $F2_1$ the correlator 18 determines the appropriate displacement of frame F2 relative to frame F1. This enables the subframes $F1_2$ and $F2_1$ to be mapped to the same set of memory locations within the frame store memory 20. As shown in FIG. 3(c), the overlapping of the subframes $F1_2$ and $F2_1$ in the frame store memory 20 is indicated by the composite frame $F1,2$.

As shown in FIG. 3(a), the eight frames F1 through F8 include common pixel locations for angular orientations of the sensor 12 between $\alpha_1$ and $\alpha_8$. FIGS. 3(a), 3(b), and 3(c) also illustrate the correlation process described above with reference to frames F1 and F2 for frame pairs F3 and F4, F5 and F6, as well as F7 and F8. Although not shown in FIGS. 3(a), 3(b) and 3(c), the correlation process is also applied to the intervening frame pairs F2 and F3, F4 and F5, and so on.

Figure 4:
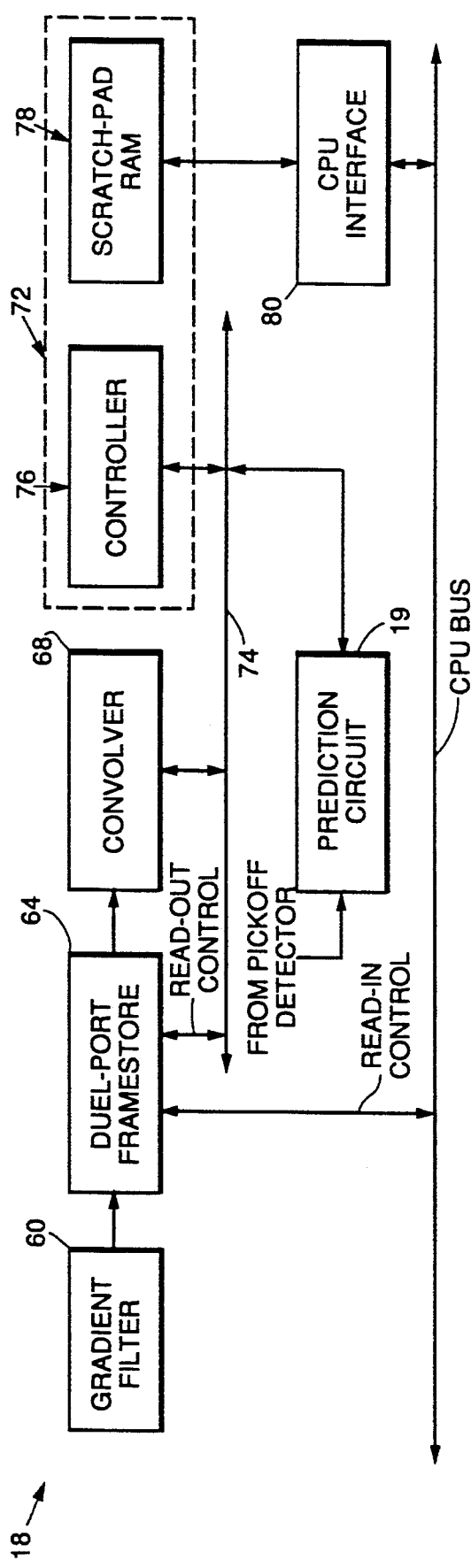
FIG. 4 depicts a block diagram of the hardware included within the correlator present in a preferred embodiment of the present invention.

FIG. 4 depicts a block diagram of the hardware included in a preferred implementation of the correlator 18. The correlator 18 will preferably include a prediction circuit 19 to anticipate the displacement of successive frames within the field of regard. The prediction circuit is in electrical communication with detectors which emit a pulse as the sensor 12 rotates through a series of "pickoff" points as it pans the field of regard. These pickoff pulses enable the prediction circuit to compute the instantaneous angular velocity of the sensor 12. The prediction circuit is also programmed with the frequency at which the sensor 12 collects data from within the field of regard (frame rate). From this information the prediction circuit can calculate the anticipated offset between successive image frames. This projected frame displacement may be used as a starting point by the correlation algorithm, thereby expediting generation of the offset parameters.

However, it is noted that the correlator 18 does not require information pertaining to the orientation of the gimbal scan mechanism within the field of regard in order to generate offset parameters indicative of the displacement between successive image frames. Accordingly, complete uniformity in the angular velocity of the sensor 12 is not required. In contrast, in conventional gimbal scanned imagers it is typically necessary to employ a complex servo system to precisely control the scan rate.

As shown in FIG. 4, image data enters the correlator 18 through a gradient filter 60. The filter 60 may be realized by a programmable preprocessor such as the Inmos IMSA110 digital signal processor. The IMSA110 is contained on a single integrated circuit and includes a 1- to 1120-stage programmable shift register, three 7-stage transversal filters, and a postprocessor.

The output of the postprocessor within the filter 60 is then fed to a dual-port framestore module 64. The framestore 64 includes a controller for implementing all of the counters and shift registers required for data storage in, for example, a single EPMS128 erasable programmable logic device (EPLD). The module 64 is typically realized as a 32-byte by 256-line ping-ponged, dual-ported RAM. One port is used for data input thereto and access by the CPU 90, the other port being used to transfer data to a convolver 68.

The convolver 68 may be implemented with, for instance, three EPM5128 EPLD's and a 4-bit correlator chip such as the TRW TMC220G8V1. As shown in FIG. 4, the convolver 68 receives instructions from a correlator controller 72 by way of a digital signal processing control bus 74, fetches data from the framestore 64, and sends the convolution result to the controller 72 for further processing.

The controller 72 may be realized by a digital signal processor 76 such as an ADSP2100, a scratch-pad RAM 78, and an EPROM (not shown) for firmware storage. Communication between the system CPU 90 and the correlator 18 is effected through the scratch-pad RAM 78 and CPU interface electronics 80.

Figure 5:
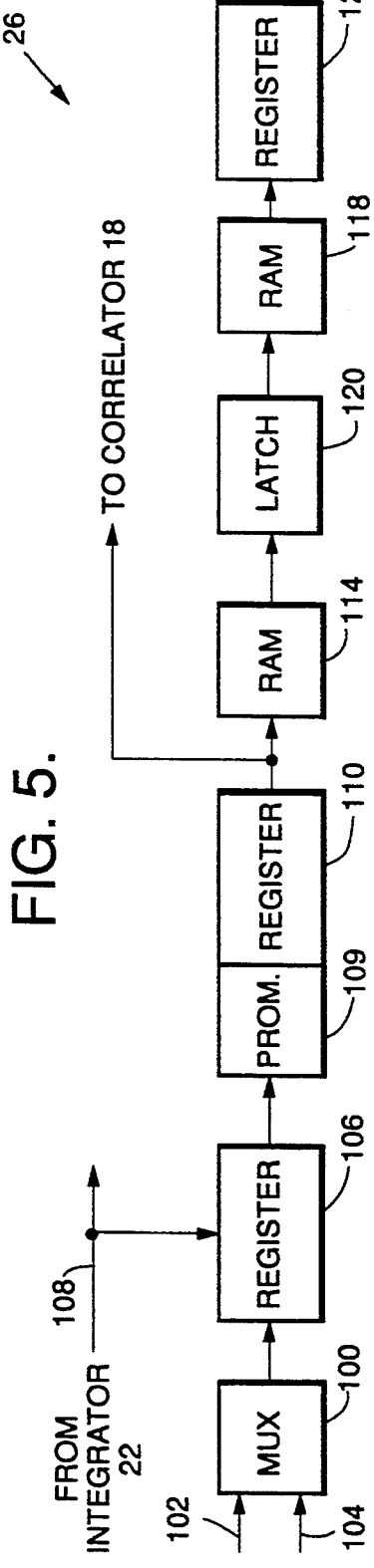
FIG. 5 is a block diagram of the frame delay module included within a preferred embodiment of the inventive imaging system.

FIG. 5 is a block diagram of the frame delay module 26 included within a preferred embodiment of the inventive system 10. As mentioned above, the frame delay module 26 transfers the row and column offset parameters generated by the scene correlator 18 to the integrator 22. Video data from the correction module 16 is transferred to the module 26 over either one or two channels. In two-channel operation, a multiplexer (MUX) 100 multiplexes between a first 102 and a second 104 video data path. In single channel operation either the path 102 or the path 104 is exclusively utilized.

After the data over the paths 102 and 104 is multiplexed, image data from defective detectors in the focal plane array ("dead cell" data) is replaced with the value of the previous cell within a register module 106. Again, the integrator 22 is operative to identify such dead cell data and to communicate this information to the module 26 via a cell correction bus 108. After dead-cell compensation, the typically 10-bit input video stream is transformed into eight bits within a PROM 108 and associated register 110. The 8-bit output of the register 110 is provided to the correlator 18 and to first and second 8×64 RAM's 114 and 118. The RAM's 114 and 118 are separated by an 8-bit latch 120. The RAM's 114 and 118 provide a delay of two image frames before data passing therethrough is transferred to the integrator 22 via an output register 124. In this way the correlator 18 is allowed sufficient time to calculate the necessary offset parameters utilized by the integrator in overlaying successive image frames in the frame store 20.

Returning to FIG. 2, by using these offset parameters the integrator 22 overlays consecutive frames of pixel values (temporarily stored in the correction module 16) within the frame store memory 20. The integrator 22 includes a memory interface 34 operative to transfer pixel values from locations within memory 20 to an adder 36, and to store values generated by the adder 36 within the memory 20. For example, if a particular set of offset parameters from the image editor 26 indicate that a pixel value from an image frame temporarily stored in the module 16 is to be placed in a first location within memory 20, the interface 34 will first retrieve the pixel value currently stored in the first location within memory 20. The current pixel value from the first location is then transferred by the interface 34 to the adder 36. The adder 36 adds the current pixel value from the first location to the indicated pixel value from the module 16 and communicates the resultant updated pixel value for the first location to the interface 34. The interface 34 then stores this updated pixel value in the first location of memory 20.

As can be appreciated by reference to FIG. 3(a) and to the discussion relating to operation of the integrator 22, the portions of the image frames located within a single image frame from the periphery of the field of regard overlap with fewer image frames than do those not so located. For example, as shown in FIG. 3(a) the far left one-eighth portion of the first frame F1 is not overlapped by any other image frame. The adjacent one-eighth portion of frame F1 is overlapped by frame F2, and the third eighth portion of frame F1 is overlapped by F2 and F3. In contrast, all pixel locations in frame F9 and all locations in frames to the right thereof are overlapped by pixel values from seven other image frames. It follows that there will typically be a slight diminution in the intensity of the extreme peripheral portions of a displayed image if the field spanned by the displayed image is sufficiently wide to encompass pixel data from the peripheral frames in the memory 20. Alternatively, the pixel values within these peripheral frames may be increased by a compensation factor to equalize the intensity of the displayed image.

The enhanced signal-to-noise ratio exhibited by the inventive system 10 is also related to the number of image frames overlaying a particular location within the memory 20. Specifically, the signal-to-noise ratio associated with each pixel value location within the memory 20 increases in proportion to the square root of the number of frames overlaying the location. This estimation is predicated on the noise inherent in the overlaid pixel values being non-correlated, as well as on a linear addition of pixel values being processed by the integrator 22.

As was mentioned in the Background of the Invention, in real-time scanning imaging systems incorporating a detector array an interpolation scheme has been employed to partially compensate for defective detectors. That is, the data from the defective detector is supplanted by an average of the data from neighboring detectors. Although offering some improvement in image quality, this technique obviously generates some degree of image distortion. Since a number of image frames overlay each location within the memory 20, the present invention allows defective detectors within the sensor 12 to be completely turned off without creating a "hole" in the image generated by the display 24. This result follows since a different detector is responsible for generating the data stored in a particular location within the memory 20 as successive image frames are overlayed therein. In this manner the "dead-cell" correction feature of the present invention allows imperfect detector arrays to be incorporated within the sensor 12 without impairing image quality.

At the commencement of scanning by the sensor 12 all locations within memory 20 are initialized to zero. The memory 20 is then filled by the integrator 22 during a first scan of the field of regard by the sensor 12 in, for example, the left-to-right direction. Upon reaching the right boundary of the field of regard, the sensor 12 begins a second scan from right-to-left. During this second scan the contents of the memory 20 are again refreshed by the integrator 22 as described above.

As mentioned above, the display 24 is operatively coupled to the frame store memory 20. The display 24 may constitute a conventional television monitor or a display typically used with conventional infrared imagers such as the RS-170. The RS-170 has 525 horizontal lines (480 active lines) and a 4 by 3 aspect ratio (horizontal to vertical).

Figure 6:
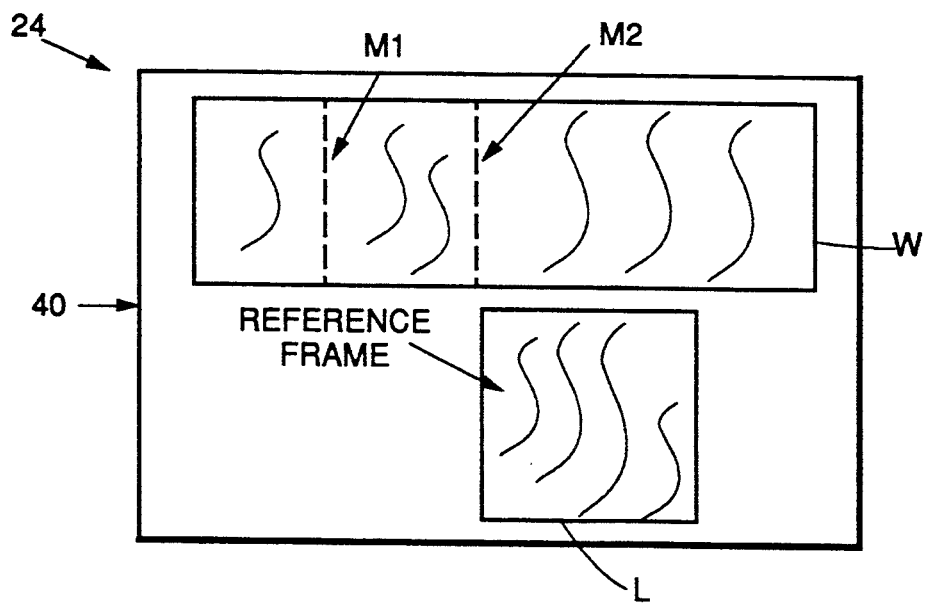
FIG. 6 illustrates a viewing mode in which pixel data from the frame store memory and from the image frame most recently stored in a sensor memory are simultaneously displayed on a monitor included within a video display.

FIG. 6 illustrates a viewing mode in which pixel data from the frame store memory 20 and from a selected portion thereof are simultaneously displayed on a monitor 40 included within the display 24. Specifically, in the front view of FIG. 6 a wide field image W and a reference image L are displayed on the monitor 40. The wide field image W is formed as described above on the basis of the pixel values within the memory 20, while the reference image L is created by displaying particular contents of the memory 20 identified by way of the controller 91. By manipulating the controller a viewer can select a reference frame (defined by symbology markers M1 and M2) within the wide field image W. The reference frame is then magnified and presented on the display 24 proximate the wide field image.

While the present invention has been described herein with reference to a particular embodiment, it is understood that the invention is not limited thereto. The teachings of this invention may be utilized by one having ordinary skill in the art to make modifications within the scope thereof. For example, the inventive wide field of regard imaging system is not limited to scanning arrangements incorporating detector arrays mounted on a rotating gimbal. Any sensing device capable of providing a sequence of framed image data may be used in the manner disclosed herein. In addition, the present invention is not limited to embodiments employing the aforementioned integrator to facilitate overlay of consecutive image frames in the frame store memory. Those skilled in the art may be aware of other schemes suggested by the teachings herein for combining the pixel values from overlapping image frames.

It is therefore contemplated by the appended claims to cover any and all such modifications.

Accordingly,

What is claimed is:

1. An imaging apparatus for providing a composite digital representation of a scene over a field of regard, said apparatus comprising:
   sensor means for generating first and second digital representations of first and second framed regions within said field of regard, said sensor means including a sensor having a field of view substantially less than said field of regard and means for scanning said sensor over said field of regard to generate said first and second digital representations of first and second framed regions, wherein said sensor means further includes a first array of sensor memory locations for storing said first digital representation and a second array of sensor memory locations for storing said second digital representation;
   means for correlating said first and second digital representations to generate offset parameters indicative of relative locations of said first and second framed regions within said field of regard, wherein said means for correlating further includes image editor means for mapping said first and second arrays of sensory memory locations into memory locations within said wide field of regard memory in accordance with said offset parameters thereby registering said first and second digital representations in said frame store memory; and
   means responsive to said offset parameters for combining said first and second digital representations to synthesize said composite digital representation of said scene, wherein said means for combining said first and second representations includes a frame store memory having an array of memory locations.

2. The apparatus of claim 1 wherein said first digital representation includes a first array of pixel values, each of said pixel values within said first array being associated with one of said locations within said first sensory memory array.

3. The apparatus of claim 2 wherein said second digital representation includes a second array of pixel values, each of said pixel values within said second array being associated with one of said locations within said first sensory memory array.

4. The apparatus of claim 3 wherein said means for combining includes means for integrating said first and second pixel arrays.

5. The apparatus of claim 4 wherein said means for integrating includes an adder circuit for adding those pixel values within said first and second pixel arrays which are mapped to a set of overlapping memory locations in said frame store memory.

6. An apparatus for providing a composite image of a scene within a field of regard, said apparatus comprising:
   sensor means for generating first and second digital representations of first and second framed regions within said field of regard, said sensor means including a sensor having a field of view substantially less than said field of regard and means for scanning said sensor over said field of regard to generate said first and second digital representations of first and second framed regions, wherein said sensor means includes a prediction circuit for predicting the location of said second framed region within said field of regard;
   means for correlating said first and second digital representations to generate offset parameters indicative of relative locations of said first and second framed regions within said field of regard;
   means responsive to said offset parameters for combining said first and second digital representations to synthesize a composite digital representation of said scene; and
   display means for generating said composite image in response to said composite digital representation.

7. The invention of claim 6 wherein said display means further includes means for simultaneously displaying a second image, said second image being a subset of said composite image and being of a higher resolution than said composite image.

8. A method for providing a composite image representation of a scene within a field of regard, said method comprising the steps of:
   generating first and second digital representations of first and second framed regions within said field of regard, using a sensor having a field of view substantially less than said field of regard and means for scanning said sensor over said field of regard to generate said first and second digital representations of first and second framed regions;
   storing said first digital representation in a first array of memory locations and storing said second digital representation in a second array of memory locations;

correlating said first and second digital representations to generate offset parameters indicative of relative locations of said first and second framed regions within said field of regard;

mapping said first and second arrays of sensory memory locations into memory locations within a frame store memory in accordance with said offset parameters thereby registering said first and second digital representations in said frame store memory; and using said offset parameters to combine said first and second digital representations to synthesize said composite digital representation of said scene.

9. The method of claim 8 wherein said step of combining includes the step of integrating the contents of said first and second arrays.

10. The method of claim 9 wherein said step of integrating includes the step of adding the contents of locations within said first and second arrays mapped to overlapping locations within said frame store memory.

11. The method of claim 10 wherein said step of generating includes the step of collecting digital image data from a plurality of detectors in optical alignment with said scene.

12. The method of claim 11 wherein said step of integrating includes the step of disregarding the contents of said first array associated with a defective one of said detectors.

13. The method of claim 12 wherein said step of integrating further includes the step of substituting an averaged data value in said frame store memory in lieu of data values associated with a defective one of said detectors and further includes the step of counting the number of data values not associated with a defective one of said detectors.

14. The method of claim 13 further including the step of reading out the contents of said frame store memory to a display of predetermined dynamic range.

15. The method of claim 14 further including the step of adjusting the image engendered by said display in accordance with said dynamic range and said counted number of data values.

* * * * *